(12) United States Patent
Hahn et al.

(10) Patent No.: US 7,243,156 B2
(45) Date of Patent: *Jul. 10, 2007

(54) INFORMATION DISTRIBUTION METHOD AND SYSTEM

(75) Inventors: Chris P. Hahn, Merced, CA (US); Peter V. Gissel, Incline Village, NV (US)

(73) Assignee: Digital Integrator, Inc., Incline Village, NV (US)

( * ) Notice: Subject to any disclaimer, the term of this patent is extended or adjusted under 35 U.S.C. 154(b) by 473 days.

This patent is subject to a terminal disclaimer.

(21) Appl. No.: 10/801,572

(22) Filed: Mar. 17, 2004

(65) Prior Publication Data

US 2004/0177156 A1 Sep. 9, 2004

Related U.S. Application Data

(63) Continuation of application No. 09/702,989, filed on Nov. 1, 2000, now Pat. No. 6,725,446.

(51) Int. Cl.
*G06F 15/16* (2006.01)
*G06F 9/44* (2006.01)
*G06F 15/00* (2006.01)
*G06F 13/00* (2006.01)
*G06F 11/00* (2006.01)
*G06F 17/30* (2006.01)

(52) U.S. Cl. .................. 709/231; 717/103; 715/513; 719/310; 719/328; 719/330; 714/1; 714/35; 714/37; 726/2

(58) Field of Classification Search .................. None
See application file for complete search history.

(56) References Cited

U.S. PATENT DOCUMENTS

| 4,868,866 | A | 9/1989 | Williams, Jr. |
|---|---|---|---|
| 5,471,629 | A | 11/1995 | Risch |
| 5,574,934 | A | 11/1996 | Mirashrafi et al. |
| 5,717,604 | A | 2/1998 | Wiggins |
| 5,740,549 | A | 4/1998 | Reilly et al. |
| 5,802,518 | A | 9/1998 | Karaev et al. |
| 5,805,804 | A | 9/1998 | Laursen et al. |
| 5,864,871 | A | 1/1999 | Kitain et al. |
| 5,920,867 | A | 7/1999 | Van Huben et al. |
| 6,006,251 | A | 12/1999 | Toyouchi et al. |
| 6,038,564 | A | 3/2000 | Sameshima et al. |
| 6,047,327 | A | 4/2000 | Tso et al. |
| 6,081,665 | A | 6/2000 | Nilsen et al. |
| 6,119,109 | A | 9/2000 | Muratani et al. |

(Continued)

OTHER PUBLICATIONS

Title: An Architecture Style for Multiple Real-Time Data Feeds, author: Roodyn et al, AMC. 1999.

(Continued)

*Primary Examiner*—Antony Nguyen-Ba
(74) *Attorney, Agent, or Firm*—Davidson Berquist Jackson & Gowdey LLP

(57) ABSTRACT

A method and system for integrating plural disparate information sources into a single stream of information using middleware. Data received from real-time sources (e.g., stock quotes) is given priority for distribution over non-real-time sources (e.g., news sources). By coordinating between several servers, data can be distributed in a load-balanced fashion which also performs self-healing in the face of server errors.

20 Claims, 19 Drawing Sheets

DI middleware dynamically integrates corporate data with data from outside sources through the Internet, extranets, wide area networks and local area networks.

U.S. PATENT DOCUMENTS

| | | |
|---|---|---|
| 6,202,060 B1 | 3/2001 | Tran |
| 6,256,676 B1 | 7/2001 | Taylor et al. |
| 6,317,872 B1 | 11/2001 | Gee et al. |
| 6,327,628 B1 | 12/2001 | Anuff et al. |
| 6,493,868 B1 | 12/2002 | DeSilva et al. |
| 6,536,037 B1 * | 3/2003 | Guheen et al. ............. 717/151 |
| 6,539,538 B1 | 3/2003 | Brewster et al. |
| 6,615,166 B1 * | 9/2003 | Guheen et al. ............... 703/27 |
| 6,630,945 B1 | 10/2003 | MacInnis et al. |

OTHER PUBLICATIONS

TITLE: Design, implementation, and evaluation of a software-based real-time Ethernet protocol, author: Venkatramani et al, ACM, 1995.

TITLE: A periodic object model for real-time system, author: Callison, ACM, May 1994.

TITLE: The design and performance of a real-time CORBA event service, author: Harrison et al, ACM, Oct. 1997.

* cited by examiner

```xml
<!-- XEBULA XML TAGSET -->
<!--   -->
<!-- CLIENT TO API -->
<DIGIGRATOR>
  <XEBULA>
    <LOGIN username="" password="" appkey="" ip="" port=""
      services="on/off" diags="on/off" />
    <LOGOUT />
    <SERVICE id="" source="" sourcetype="" type="" />
    <GETQUOTEINFO id="" source="" alias="" symbol="" state=""
      type="" />
    <GETQUOTE id="" source="" alias="" symbol="" state=""
      type="">
      <FIELD>name of field</FIELD>
    </GETQUOTE>
    <STARTQUOTE id="" source="" alias="" symbol="" state=""
      type="">
      <FIELD>name of field</FIELD>
      <!-- *deprecated* -->
    </STARTQUOTE>
    <STOPQUOTE id="" />
    <GETHEADLINES source="" hours="" stories="" mrdate=""
      mrtime="">
      <NEWSCODES>
        <NEWSCODE type="">codetext</NEWSCODE>
      </NEWSCODES>
    </GETHEADLINES>
    <GETSTORY id="" source="" date="" time="">headline text
      of story to get</GETSTORY>
    <GETFIXEDPAGE id="" source="" page="" />
    <STARTFIXEDPAGE id="" source="" page="" />
    <STOPFIXEDPAGE id="" />
  </XEBULA>
```

*FIG. 5A*

```
-<XEBULAINFO>
    <WHORU />
 </XEBULAINFO>
-<XEBULAFILE>
    <SETFILE filename="">text to set</SETFILE>
    <GETFILE filename="" />
    <DELETEFILE filename="" />
    <GET DIR />
 </XEBULAFILE>
-<!--    -->
-<!-- API TO CLIENT -->
-<XEBULA>
    <DIAG type="">(types-> error,connection,login,ack,nack,init)
       text of diagnostic</DIAG>
    <SERVICE id="" source="" sourcetype="" type="">"on" or
       "off"</SERVICE>
    <SESSION />
    <QUOTE id="" type="" field="" denom="">value/text of
       quote</QUOTE>
    <GETQUOTEEND id="" />
    <QUOTEINFO id="" source="" alias="" symbol="" state=""
       type="" />
    <QUOTEINFOEND />
   -<HEADLINE source="" date="" time="" type="">
       headline text
      -<NEWSCODES>
          <NEWSCODE type="">codetext </NEWSCODE>
       </NEWSCODES>
    </HEADLINE>
   -<HEADLINECHANGE>
      -<HEADLINE source="" date="" time="" type="old">
          oldHeadlineText
        -<NEWSCODES>
```

*FIG. 5B*

```
            <NEWSCODE type=""> codetext </NEWSCODE>
          </NEWSCODES>
        </HEADLINE>
      - <HEADLINE source="" date="" time="" type="new">
          newHeadlineText
          - <NEWSCODES>
              <NEWSCODE type=""> codetext </NEWSCODE>
            </NEWSCODES>
        </HEADLINE>
      </HEADLINECHANGE>
      <GETHEADLINESEND source="" />
    - <STORY id="" date="" time="">
        story text
      - <STORYHEADLINE source="" date="" time="" type="">
          headline text
          - <NEWSCODES>
              <NEWSCODE type=""> codetext </NEWSCODE>
            </NEWSCODES>
        </STORYHEADLINE>
      </STORY>
    - <FIXEDPAGE id="" row="" column="" type="">
        text to display
        <FPATTR start="" stop="" time=""> name of
          attribute </FPATTR>
      </FIXEDPAGE>
  </XEBULA>
- <XEBULAINFO>
    <TITLE> title </TITLE>
    <VERSION date=""> version </VERSION>
    <COPYRIGHT> copyright </COPYRIGHT>
    <AUTHOR> name </AUTHOR>
  </XEBULAINFO>

- <XEBULAFILE>
    <FILE filename="" found="yes/no"> CDATA of text that was
      got </FILE>
    <DELETEFILE filename="" found="yes/no" />
    - <DIR>
        <FILENAME> filename </FILENAME>
        <FILENAME> filename </FILENAME>
      </DIR>
  </XEBULAFILE>
</DIGIGRATOR>
```

| Index | last time | change | last trade | last2 | last3 | bid | ask | high | low |
|---|---|---|---|---|---|---|---|---|---|
| DJI | | | | | | | | | |
| DJT | | | | | | | | | |
| DJU | | | | | | | | | |
| DJ0Z | 15:15:02 | | 10515.0 | 10515.0 | 10520.0 | | | 10689.0 | 10440.0 |
| DJ1H | 14:30:40 | | 10635.0 | 10635.0 | 10640.0 | | | 10795.0 | 10645.0 |
| DJ1M | 00:00:00 | | | | | | | | |
| DJ1Z | 00:00:00 | | | | | | | | |
| ZD0Z | 11:29:18 | | 10572.0 | 10572.0 | 10572.0 | 10504.0 | 10523.0 | | 10523.0 |
| ZD1H | 00:00:00 | | | | | | | | |
| ZD1M | 00:00:00 | | | | | | | | |
| ZD1Z | 00:00:00 | | | | | | | | |

* Market News Bullet Points *

STOCKS: Dow ended off by 110 points while the Nasdaq was down by 72, both off their worst levels but still weak. Tech stocks the hardest hit with profit-warner Lucent Technologies paying the price as its stock tumbled $10, or about 33%, to close around $21 1/4. That said, profit reporters, Yahoo! exceeding expectations and Motorola matching forecasts, saw their stocks beaten down due to negative future expectations. Yahoo! ended down $17 at $65 while Motorola was off about $5 at $21. There were some winners, MSDW lifted over $4 after suffering over several sessions as the co. issued a statement dispelling unsubstantiated talk of hefty losses in the high yield area. Other winners included

Figure 13

INFORMATION DISTRIBUTION METHOD AND SYSTEM

CROSS-REFERENCE TO RELATED APPLICATIONS

The present application is a continuation of U.S. patent application Ser. No. 09/702,989 filed on Nov. 1, 2000 now U.S. Pat. No. 6,725,446, the contents of which are incorporated herein by reference in their entirety.

BACKGROUND OF THE INVENTION

1. Field of the Invention

The present invention is directed to a method and system for integrating heterogeneous information services, and more particularly to a method and system for assembling heterogeneous information streams with asynchrounous or digital rates of arrival into a single information stream.

2. Discussion of the Background

Real-time delivery of information is an integral part of the decision making process of many brokers and investors. Accordingly, real-time information services spend a considerable amount of money delivering such information to a multitude of subscribers. Generally, such information is distributed over a series of wide-band pipes (e.g., leased lines from the information server). Such a delivery mechanism, however, is contrary to the distributed communication architecture used generally across the Internet. On the Internet, subscribers generally are connected to an Internet Service Provider on a connection shared for multiple purposes (e.g., Web browsing and stock trading).

SUMMARY OF THE INVENTION

It is an object of the present invention to provide real-time information services without requiring a dedicated, communications medium.

It is a further object of the present invention to provide an event driven information delivery system that combines plural information streams.

It is another object of the present invention to provide an integration of event driven information delivery systems in middleware.

It is yet a further object of the present invention to provide an event driven information delivery system that combines plural information streams into real-time or snapshot delivery methods.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 5A–5C is an exemplary XML stream for displaying real-time data;

FIGS. 7–9 are exemplary screenshots illustrating data display methods according to a first aspect of the present invention;

FIGS. 10–12 are exemplary screenshots illustrating data display methods according to a second aspect of the present invention;

FIGS. 13–15 are exemplary screenshots illustrating data display methods according to a third aspect of the present invention;

DESCRIPTION OF THE PREFERRED EMBODIMENT

Figure 1:
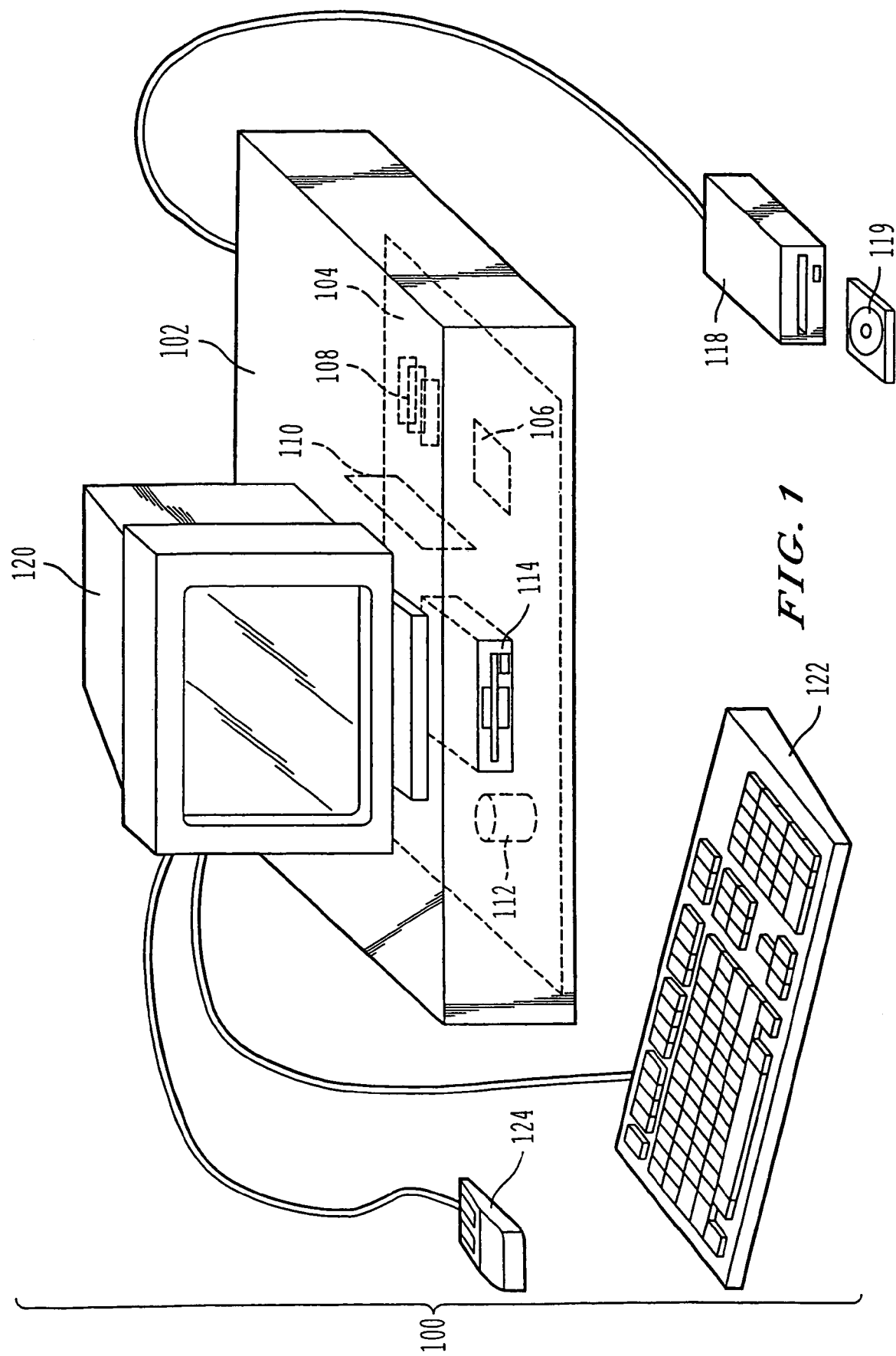
FIG. 1 is a schematic illustration of a computer for providing information integration services according to the present invention.

Referring now to the drawings, wherein like reference numerals designate identical or corresponding parts throughout the several views, FIG. 1 is a schematic illustration of a computer system for providing integrated information services. A computer 100 implements the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies. In addition, a printer (not shown) also provides printed listings of the integrated information from disparate information services.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for integrating information services. The computer code devices of the present invention can be any interpreted or executable code mechanism, including but not limited to scripts, interpreters, dynamic link libraries, Java classes, and complete executable programs. Computer code devices may also be downloaded across a network using a network adapter (e.g., token ring or Ethernet) as an equivalent to embedding the computer code device within a computer readable medium.

Figure 2:
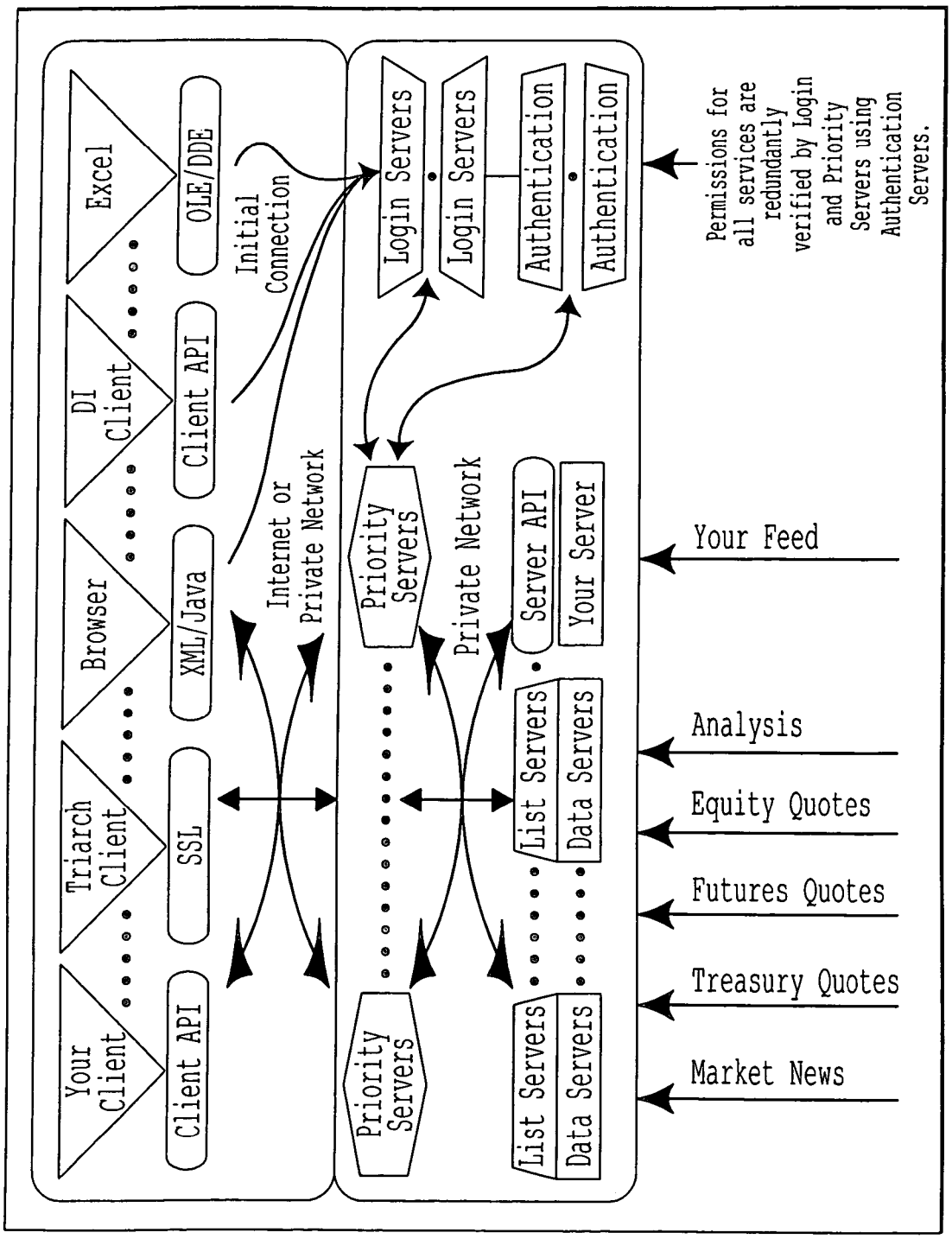
FIG. 2 is a schematic illustration of plural computers acting in concert to provide information integration services to multiple clients according to the present invention.

As shown in FIG. 2, a variety of content from plural information services are channeled through a series of data servers (e.g., a duster of NT servers) that coordinate with priority servers. In order to keep pace with the number of users simultaneously requesting information, the present invention preferably includes redundant data servers, one of which serves one set of users and another which serves other users. The number of connections to each data server is dynamically load-balanced (either at connection time or during connections). In the presence of a failure of one of the data servers, communications routed to a client from one data server are passed off to another data server. The responsibility of reconnecting a client in light of failure of either a data server or a priority can be assigned to any one, or a combination of, the client, the data server and the priority server. Generally, a client would see that services have disappeared when a connection to a priority server is lost, and the client would seek to re-establish communications with another server based on a series of rules on primary and secondary priority servers. Similarly, if a priority server loses contact with a data server, it can seek out a replacement data server based on a series of rules on primary and secondary data servers. (To load balance the servers during operations, lower level servers can periodically shut down all connections to upper level clients/servers such that the connections are re-established using rules that will spread the load. For example, priority servers may periodically shut off connections to all clients such that the clients seek out new priority servers.)

Figure 3:
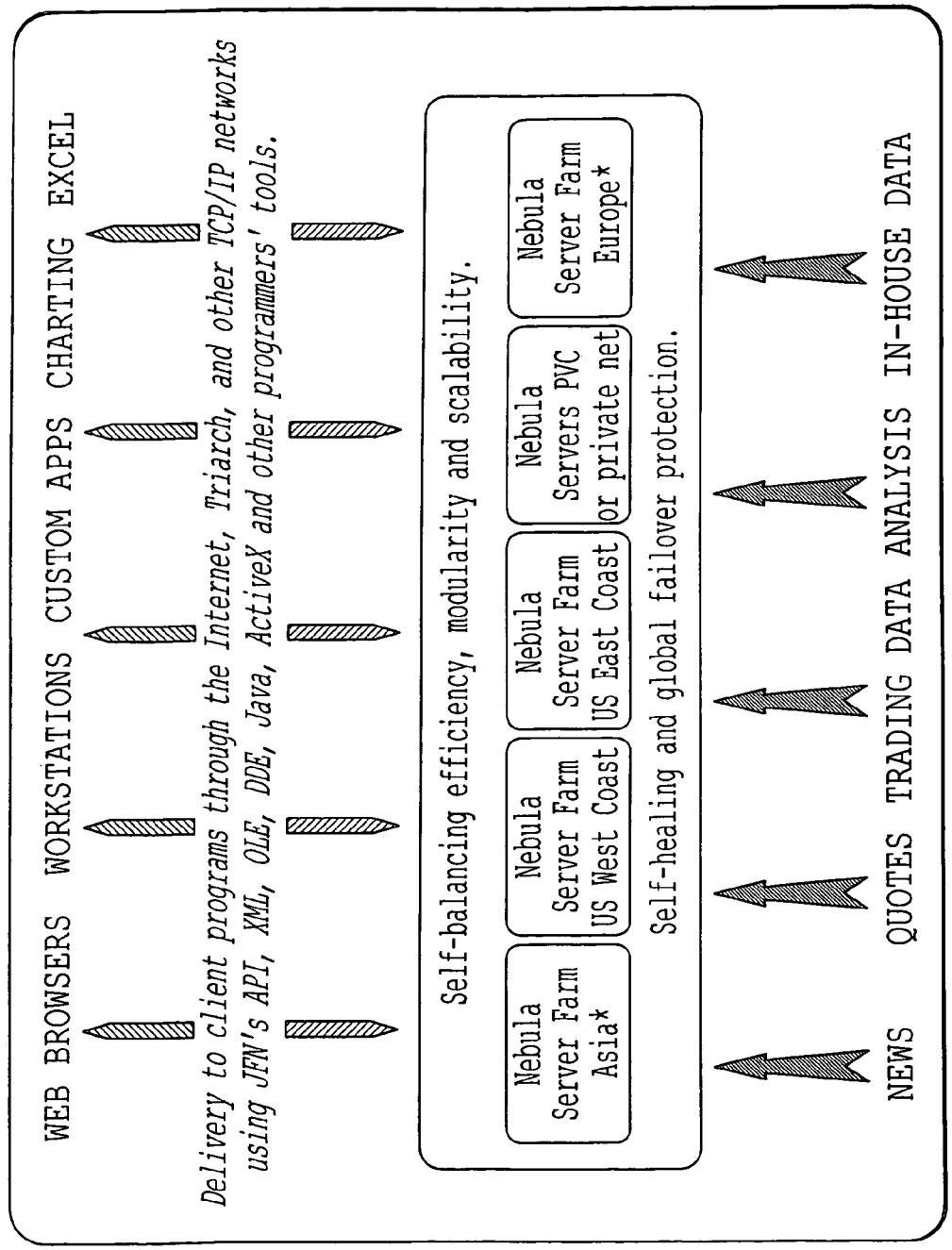
FIG. 3 is a conceptual diagram of plural data clients being provided with data integrated from plural information services using middleware.

The system may increase capacity by adding more servers (data, priority, etc.). In some cases multiple servers can be configured to run on a single machine. For example, a priority server and a login server can run on a single computer, but there must be at least one other computer running both server applications. In fact, as shown in FIG. 3, the services of plural servers can be integrated into a single middleware product to facilitate its incorporation into third party products.

The information from the data servers can include information from stock exchanges, futures markets, news organizations, and data analysis feeds. The information is delivered via a multi-directional, wide area communication protocol (e.g., UDP/IP, RDP/IP, TCP/IP).

Generally, for some types of information error detection and retransmission is necessary, but for other types of data, it is sufficient to wait until the next update arrives to provide the user with data that was lost or corrupted. In the context of an error-correcting protocol, the lower level servers may communicate change information only since a client is guaranteed to have the most recent information. In non-retransmission systems, it is preferable to send the absolute value of the information rather than just the change.

An alternative protocol, PCT/IP, designed by applicants provides several benefits over raw TCP/IP. It initiates connections between client and server. It provides the option of having any number of primary servers or nebula to connect to. It also provides the option of having any number of backup servers to connect to in the event the primary are unreachable. It will automatically reinitiate connections allowing for failover capability. It provides compression and encryption for transmission of data.

It is possible to transfer data by parsing the data fields sequentially into a message for transmission and then parse the data fields out on the receiving end, but such a process may be cumbersome. Instead, data structures may be transferred directly by encoding objects into a stream of bytes allowing for greater compression since there is no parsing information contained in the message. This may increase speed since the message is smaller and there is less processing involved in the transmission and reception.

Once in the servers, the data are post-processed (or "normalized" into a standard format) and passed to other servers and clients via an Application Program Interface (API). In addition to data retrieval though the API, data can be collected using other communications mechanisms and protocols (e.g., OLE, DDE, ACTIVEX objects, Webula, and XML).

Figure 4:
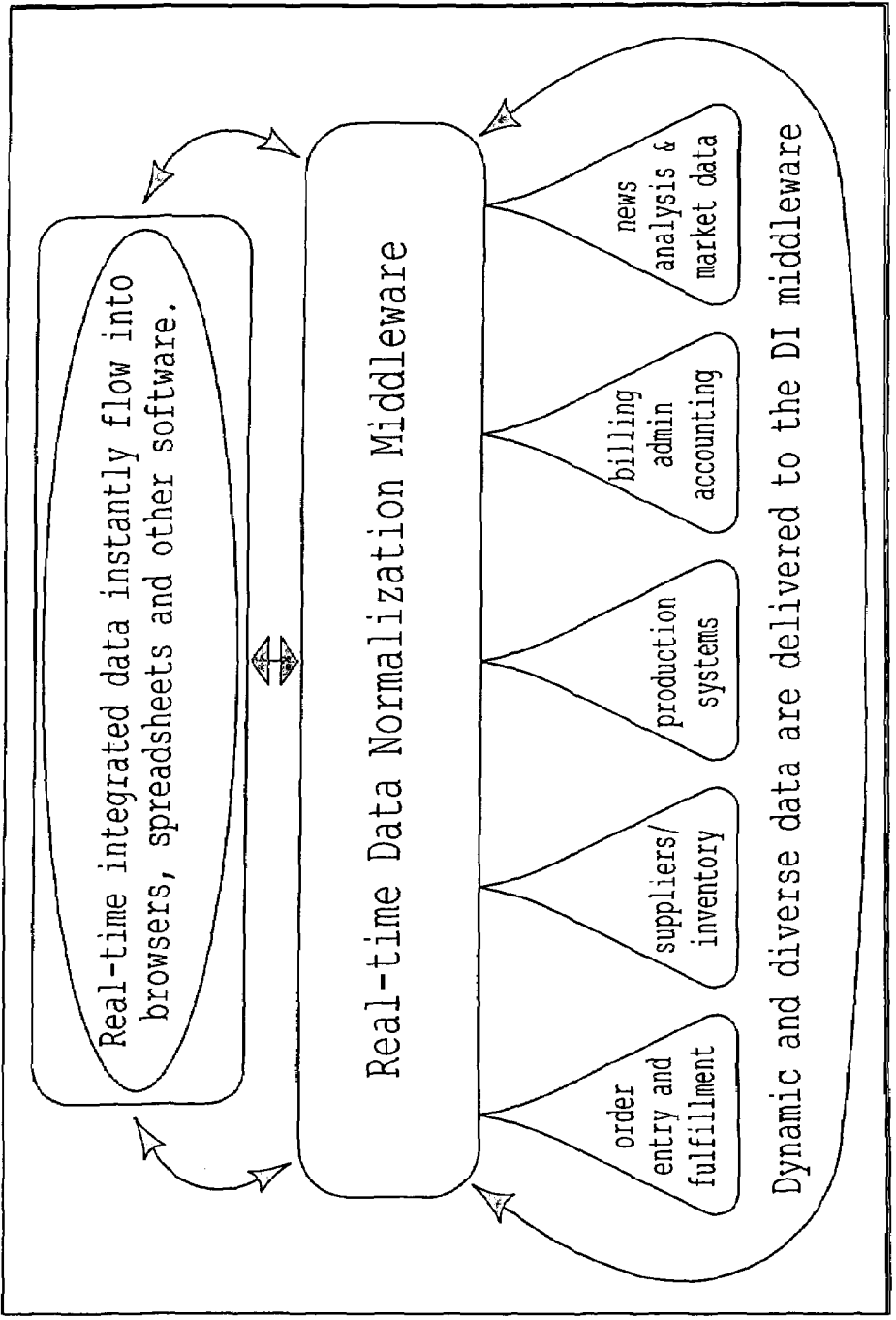
FIG. 4 is a block diagram showing the integration of non-financial and financial data sources using middleware.

As shown in FIG. 4, the data is not restricted to financial data. Any event may be added to an integrated data stream by processing the data through the API that normalizes and transmits data. Non-financial data includes order entry and fulfillment, inventory control, production system, pipeline flow measurements, tracking of train cars, busses, trucks and automobiles, refinery monitoring, warehousing, oil and gas extraction, mining and quarrying, paper manufacturing, defense and military, printing and publication, e-commerce and e-mail data processing, measuring analyzing and instrumentation, waste management and remediation, education services, health care and social assistance, arts, entertainment, and recreation, accommodation and food services, etc.

Delivery of snapshot information from priority servers to a data client (e.g., on the Web) occurs via dynamically generated content (e.g., active server pages (ASP)) as the client requests data. In a Web page embodiment, the priority servers can further format the normalized data using scripting languages (e.g., JAVASCRIPT OR VB SCRIPT programming languages). Such data can be included in frames, tables, and all other standard browser structures. Using HTML codes, data can be displayed multiple colors and fonts. Snapshots work well with browsers (e.g., the NETSCAPE browser and the INTERNET EXPLORER browser).

Streaming delivery is sometimes called event driven delivery. Simply, it means that any change in any data seen by a priority server is streamed ("pushed") to all appropriate users on their displays (e.g., browsers). Where the updated information is displayed on the native web page is based on the location as authored in the dynamic display (e.g., web page). However, by incorporating ACTIVEX controls in a visual display, the data can be visually updated on a portion of the client display without having to re-request the page in its entirety. Such changes can be displayed in changing colors to accentuate the changes. Moreover, for multi-field displays, it is preferable to allow customization of the order of those fields. For example, the order and/or presence of fields related to the contracts (e.g., Last, Open, High, Low) are individually selectable.

In one embodiment of the present invention, the streaming data is provided in an XML format, as shown in an exemplary format of FIGS. 5A–5C. By utilizing the XML format, data objects and their attributes within the stream can be quickly identified and displayed. The XML format need not be in plain text, however. In one embodiment, to further reduce bandwidth, the information sent from a priority server to a client is sent in binary, compressed, or abbreviated form. Using the information stored in the priority servers (and received from the clients), the priority servers know the events (e.g., stock price changes or order entry completion) being tracked by the clients. Thus, individual events can be given shorter representations that are converted into streaming XML on the client-side.

Event driven data delivery in a Web browser is complicated by the lack of browser standardization. Currently the INTERNET EXPLORER web browser handles event driven data far better than the NETSCAPE web browser. Accordingly, an ACTIVEX control is used as a "least common denominator" that is small and installed quickly. Future browser improvements will allow similar functionality on the NETSCAPE web browser and other browsers using plugins, applets, corn objects, and other controls.

To obtain permission to log into the DIGITAL INTEGRATOR servers a user must complete an enrollment process by filling out online forms. During this process the user's personal information such as name, address, e-mail and credit card is obtained though a proprietary system created by DIGITAL INTEGRATOR. Also selectable in this process are the services to which the users wish to subscribe (specific news services, specific quote feeds, etc.). After the user's data is captured the user will be able to select a unique user name and password combination that allows access to precisely the information to which the user subscribed. (Preferably users receive their unique user names from a series of web pages that collect customer billing and demographic information.) The permissioning can be extremely precise, allowing access to the smallest subset of a feed or it can be very broad, allowing the grouping of many feeds. This is an in-house e-commerce system developed by DIGITAL INTEGRATOR for use with the middleware.

The initial connection from a client program to the servers of the system is via Login Servers. Login Servers validate client user IDs, passwords, and data service permissions via Authentication Servers. Once permissions are established, the client is routed through the Priority Servers to the List Server/Data Server combination that has the least traffic. Only the data requested and permissioned by the client is sent through the network, minimizing network traffic. Information to a front-end program from the Data Servers is routed via the most efficient path with the lightest load.

Data Servers are optimized to speed data delivery. Different types of data servers are customized to handle the unique characteristics of each data feed. Record-based quote data servers are different than fixed page data servers or news/text data servers, but they are all normalized to allow a standardized output to a single client application. The distributed processing architecture allows individual components, described below, to handle administrative and maintenance work maximizing throughput from data servers to clients. Specialized database servers add the ability to archive and retrieve historical data (e.g., using a SQL Server system).

Figure 6A:
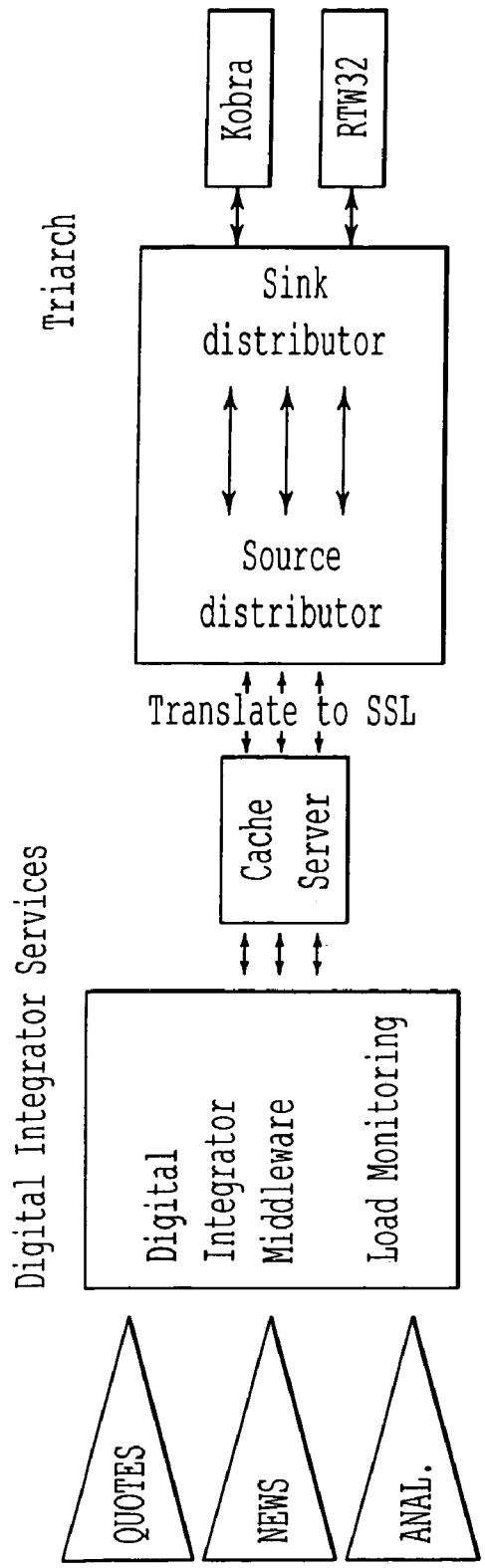
FIGS. 6A and 6B are block diagrams illustrating integration of middleware with a cache server and other external services to increase the functionality of the present invention.
Figure 6B:
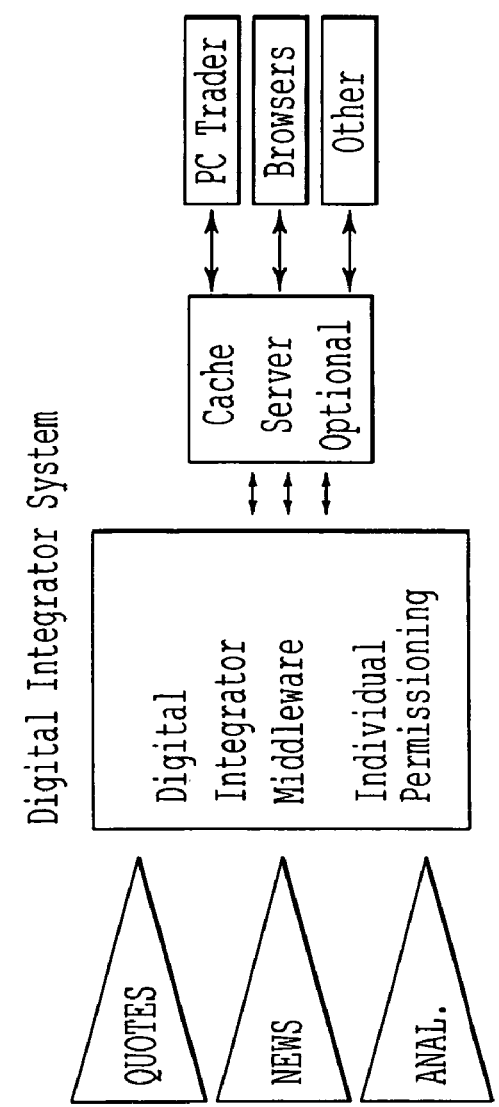

Moreover, as shown in FIGS. 6A and 6B, speed may be further increased using cache servers that connect to middleware or equivalent separate servers. The cache servers allow the caching and instant throughput of data on servers that reside on the client computers and/or on local networks that receive data from the middleware for a group of users on the receiving local networks. Caching servers can also handle more complex tasks like the translation of protocols. In one embodiment of an environment in which several related or co-located clients wish to receive the same non-real-time information, the several clients first attempt to retrieve the information from the cache server before requesting the data from the priority server. (In an alternate embodiment, the real-time data passes through the cache servers as well.)

The Login Servers handle the primary load balancing between the clients and the data servers. They direct traffic to the servers best able to handle the load (e.g., the lightest loaded or the one already serving co-located clients). Before a connection is established Authentication Servers verify user ID and passwords. Priority servers rank the order (priority) of the delivery of different types of data. Real-time data will always have the highest priority. Initial downloads to populate the screen with current data and requests for historical data will have lower priority. This functionality of the priority servers insures that the most time-sensitive data will get to the end user first. Data from multiple data servers are combined in priority servers and sent through to the client or cache server using a single connection. A final function of the priority servers is that they ensure that data goes only to permissioned users.

Configuration servers constantly monitor the configuration status of all servers. This service shares with priority servers the self-healing intelligence to instantly reroute all connections to accommodate an overloaded or failed server.

List servers keep track of the quote data being requested by the Clients. Only the issues that are in active client windows are updated in real-time. List server functionality is built into some of the data servers, but it could be built into other servers such as the priority servers.

In light of the nature and importance of the real-time data, the present invention preferably withstands the failure of a single computer or a bank of computers with minimal degradation in the delivery of data. One factor in withstanding failures is the ability to use redundancy to perform self-healing of the system. Preferably the redundancy includes server farms in physically remote locations (e.g., New York, New Jersey and the Western US). Additional levels of redundancy can span countries (e.g., having server farms in the U.S., London, and Hong Kong. Each such redundant server farm acts as a backup for the others such that all connections can be re-established through at least one redundant server farm.

Automatic failover transfer from one server farm to another is accomplished in one of three ways. First, a transfer may be initiated from the server-side. All servers and server farms are constantly monitored by a monitoring system. Technicians are alerted when a problem arises in a single server or a bank of servers. Sound, visual, and telephony alarms may be used to alert technicians when anything goes wrong with a data feed, a software service, or a hardware function. The monitor tells the exact nature of the problem on an individual server basis. When no one is physically available at the server farm the monitoring system automatically dials and gives exact messages to an off-site technician. Based on the assessment of at least one technician, the technician(s) can force one or more clients to transfer from one server farm to another. As a separate server-side transfer, the system may automatically force one or more clients to transfer from one server farm to another based on the type of problem encountered.

Second, a client program may automatically request a connectivity transfer between server farms without user intervention. For example, a client program may constantly monitor the status of its connection to a server farm. When the connection lapses for more than 30 seconds, it is automatically rerouted to a healthy server farm. Moreover, programs may share a dynamic linked library that reroutes connections to avoid recoding of the reconnection feature for add-in clients.

Finally, an end-user can manually direct, or redirect, the connection to any server farm. If the user detects a connection problem before the connection has been automatically redirected, the user has the power to force a connection to a different system. This feature is also of interest to customers who travel to remote locations. For example, a customer who travels to Australia from New York will want to direct his laptop computer to connect to the Sydney server farm instead of the New York server farm.

In addition to the server hardware and software, raw data feeds can be directed to each server farm. Equipment to handle all incoming data feeds and outgoing delivery are installed and configured at each site based on required connectivity and/or bandwidth.

In order to facilitate customizable information presentation, the present invention includes configurable screens that are arranged according to a user's preferences. Users can create their own pages with windows full of diverse data from all of the data sources that are being integrated by the system. Preferably, within the client interface, (1) historical data is easily retrievable, (2) quote data can be charted and graphed in custom formats, (3) news can be searched and profiled, (4) Web page windows can be seamlessly integrated with quote, news and analysis windows, and (5) collections of windows can be easily combined and saved as user designed "pages".

Figure 7:
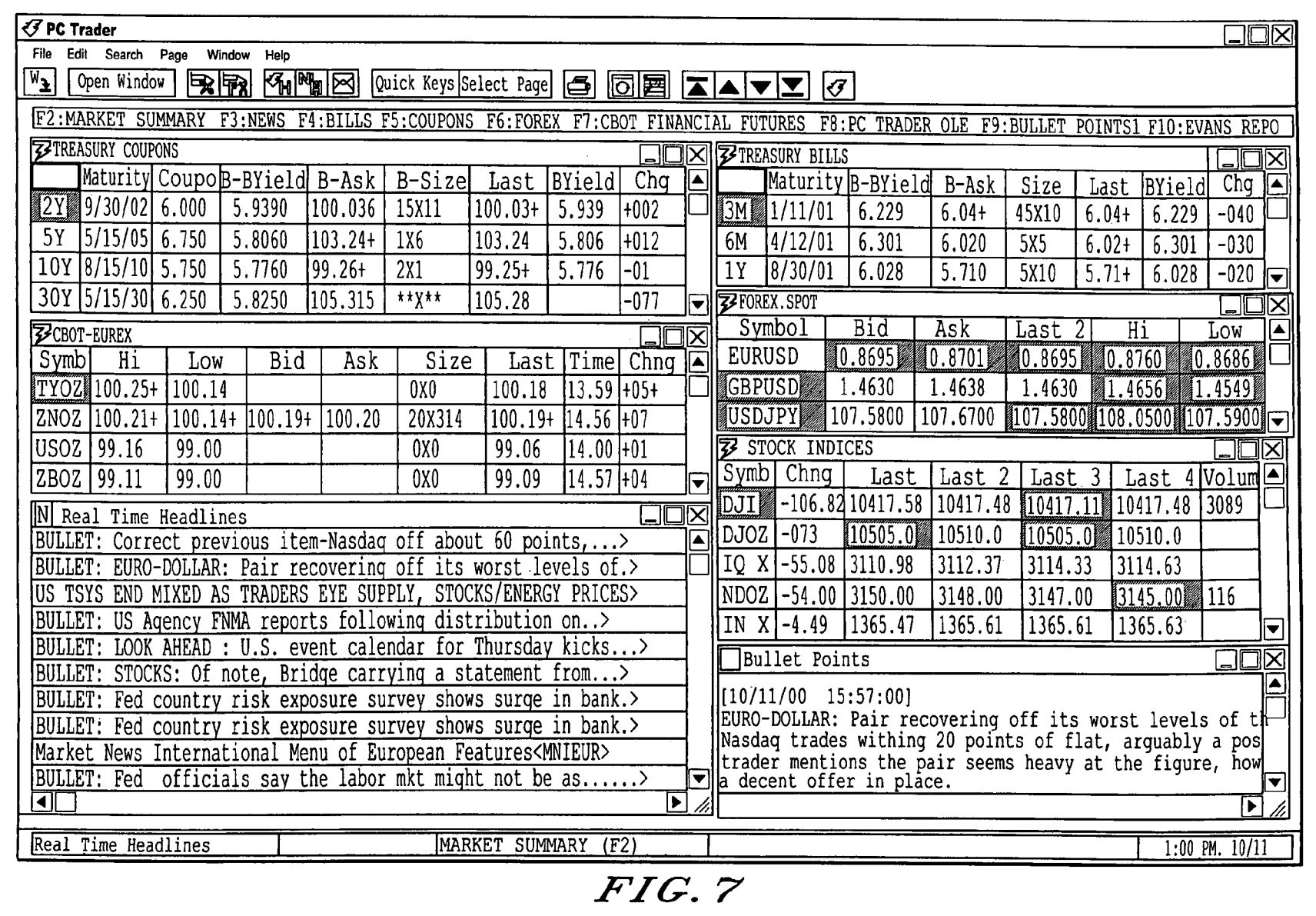

FIG. 7 illustrates an exemplary interface according to a first aspect of the invention. The interface (taken from the program entitled PC TRADER owned by the assignee of this application) is a product that delivers real-time financial data across a wide area network (e.g., the Internet or any TCP/IP network) from a middleware (e.g., the middleware layer known as the DIGITAL INTEGRATOR middleware later. Such a visual interface may be written in any programming language (e.g., C++, the VISUAL BASIC programming language, the FOXPRO programming language and the JAVA programming language), but the illustrated version is written in C++. The data may further be communicated using a protocol other than TCP/IP (e.g., the PCT/IP protocol discussed above). Such an interface may be configured to run on a workstation, a stand-alone computer, or any other computer system. According to the present invention, the operating system is a matter of design choice, and equivalent systems can be run in top of WINDOWS 95/98/NT/2000/ME operating systems, UNIX operating system, LINUX operating system, etc.

Figure 8:
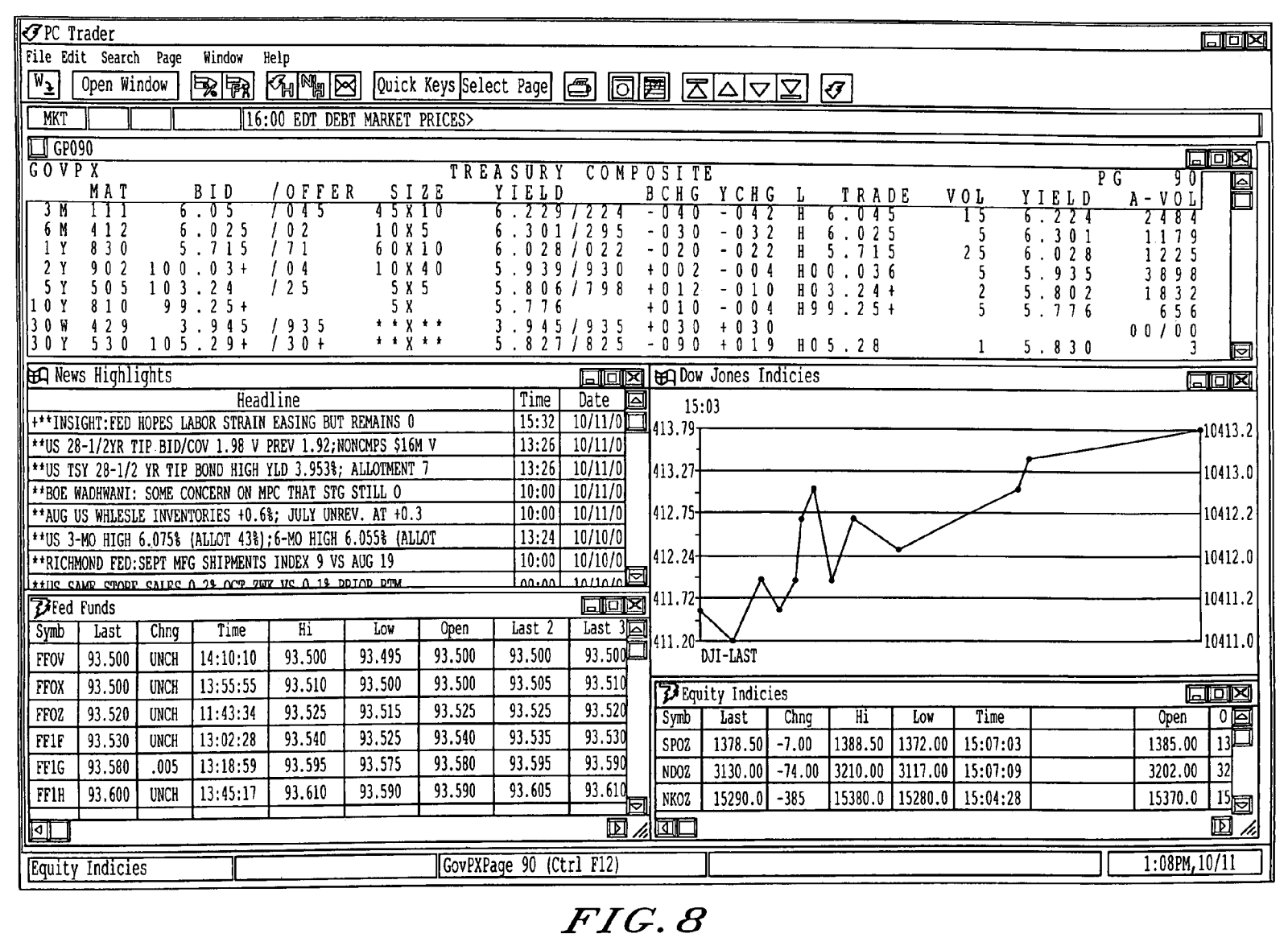

As illustrated in FIG. 8, in the preferred embodiment the user's real-time analysis is supplemented with a charting function that utilizes the real-time data that is received. Various objects work in cooperation to form the illustrated interface that simultaneously updates and displays quotes from the cash treasury markets, the futures markets, and news. One object of FIG. 8 (labeled "Treasury Composite") illustrates an updating page of financial data from an older legacy architecture. This type of screen object updates itself using commands to write at particular screen coordinates corresponding to the part of the page that has changed. The other type of screen objects are updated using "records". Each symbol (e.g., stock, index, futures contract, etc.) is a record that has unique identifiers. Both record-based and page-based objects can be updated in real-time. Moreover, the updates may include supplemental multimedia streams (e.g., sounds and graphics).

Figure 9:
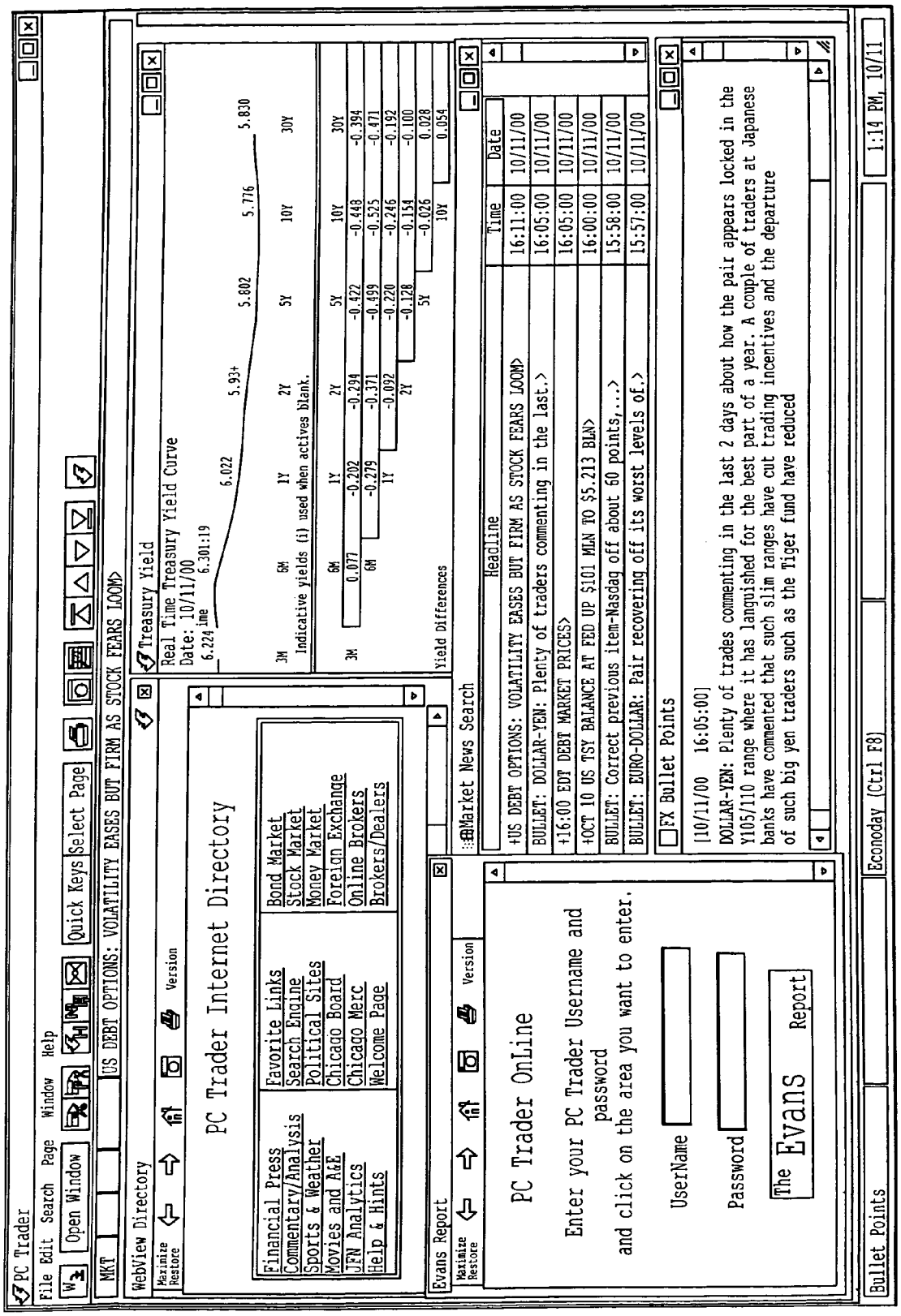

As illustrated in FIG. 9, other object types can performed more advanced calculations on the real-time data before displaying it. The illustrated real-time chart displays analytic information after processing (e.g., using arithmetic, logic and rule-based algorithms) the primary data received from the servers/middleware. Generally, the received real-time data can be used to create derived, or secondary, real-time data.

As illustrated in FIG. 10, a dedicated user interface (e.g., PC Trader) is not required to receive and process real-time data. Instead, a web browser may also receive real-time updates from the Middleware or a remote server. The illustrated interface receives (1) record-based quote information from the Chicago Board of Trade (CBOT) and (2) news from the CBOT or another source. The quote data is updated periodically (e.g., every ten seconds) directly from the Middleware. In a preferred embodiment, the data is pushed directly from the middleware to the browser. In an alternate embodiment, the data is refreshed (i.e., pulled). Having selected the "Stock Index" tab at the top of the illustrated page, the stock indices are updated in an HTML table. In a preferred embodiment, the browser on the client's computer receives the data in the binary PCT/IP format, then translates the data into a streaming XML format that is then read by the browser. In an alternate embodiment requiring additional bandwidth, the data is sent directly from the Middleware in pre-formatted XML.

Figure 11:

FIG. 11 illustrates sub-areas within the "Combinations" area. Other tabs on the top of the browser page provide quick access to various pre-set choices that the user can select. As with the other embodiments described above, the users receive live data only after logging into the Middleware (e.g., using a verifiable user name and password); however, once logged in, the user can switch from page-to-page without re-authentication. Similar to the interface of FIG. 11, FIG. 12 illustrates sub-areas within the "Financials" area.

Figure 12:
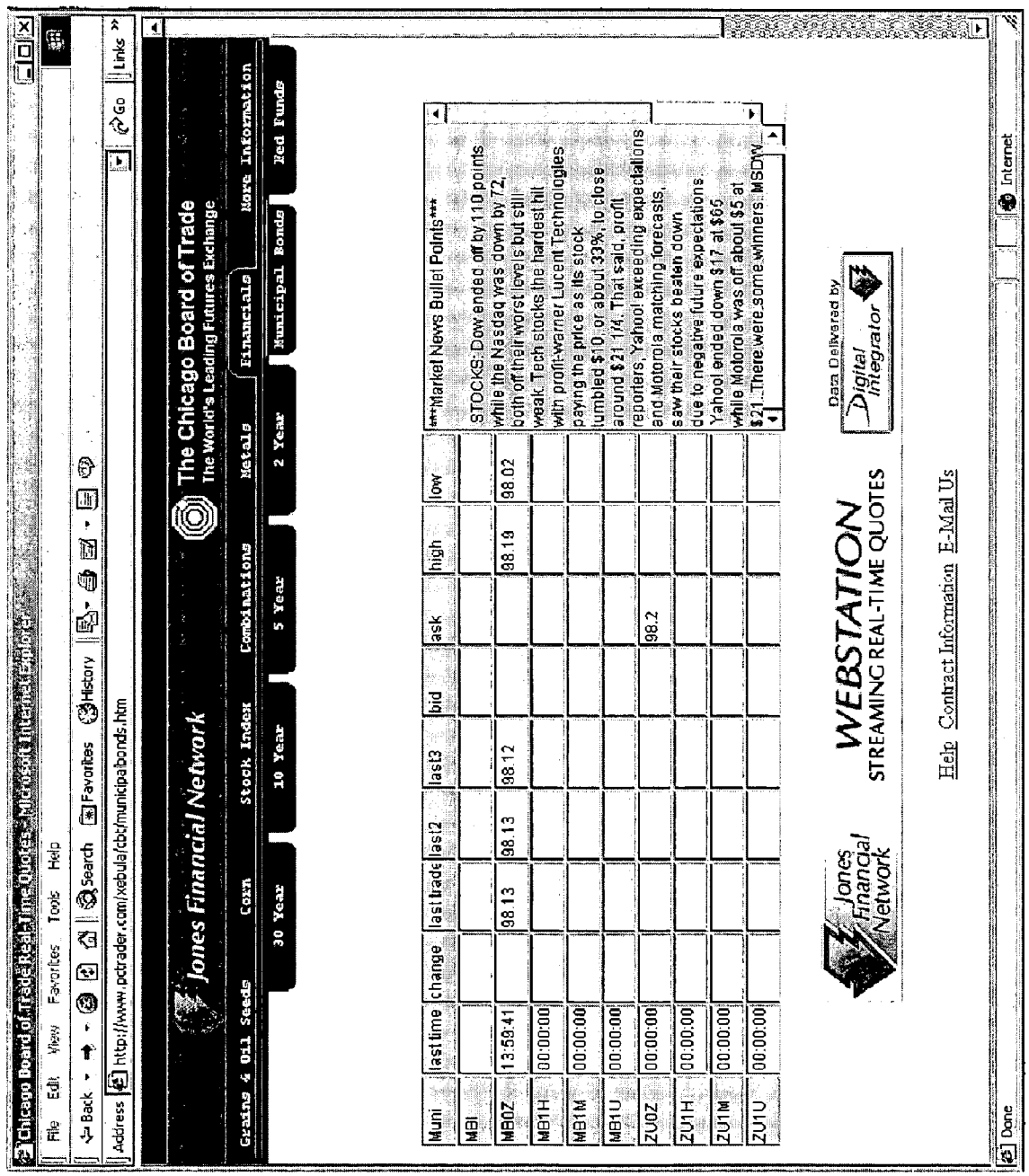

Although shown as static layouts in FIGS. 10–12, the system administrator may also enable an alternate interface that enables customization. However, due to management reasons (e.g., the additional technical support required with a customizable interface), the type of interface used by customers may be restricted by an administrator on a customer-by-customer basis.

Figure 13:
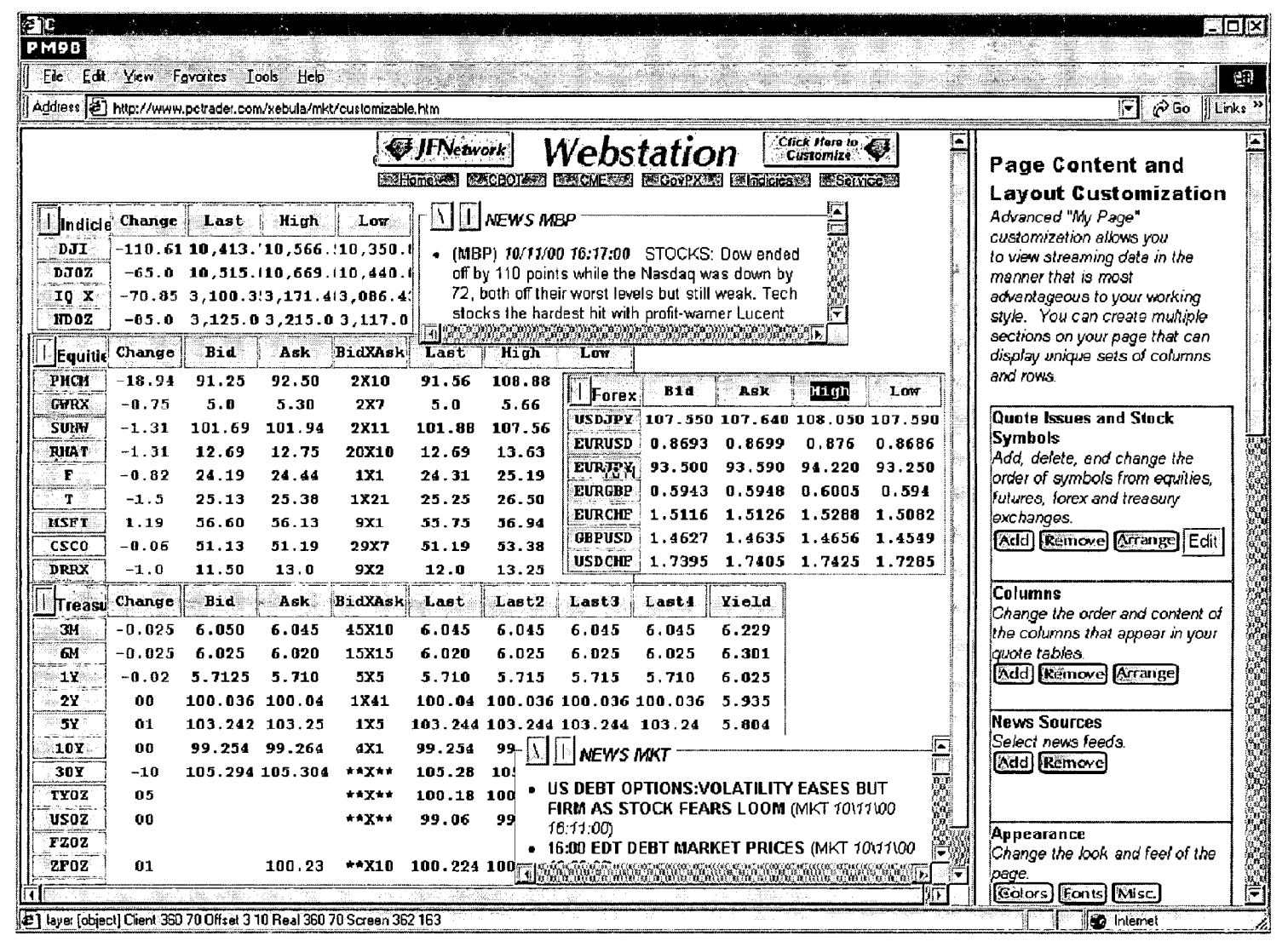

FIG. 13 illustrates an alternate Web interface that receives its updates from a middleware layer. In the illustrated embodiment, each of the different type of quote or news window is contained in a layer (window). Those layers can contain any type of HTML object that in turn can display the XML data that is derived from the middleware layer. The layers can be moved and resized by the user. The frame on the right shows the customization interface. The end user can completely customize, create and delete the data in each of the layers.

Figure 14:
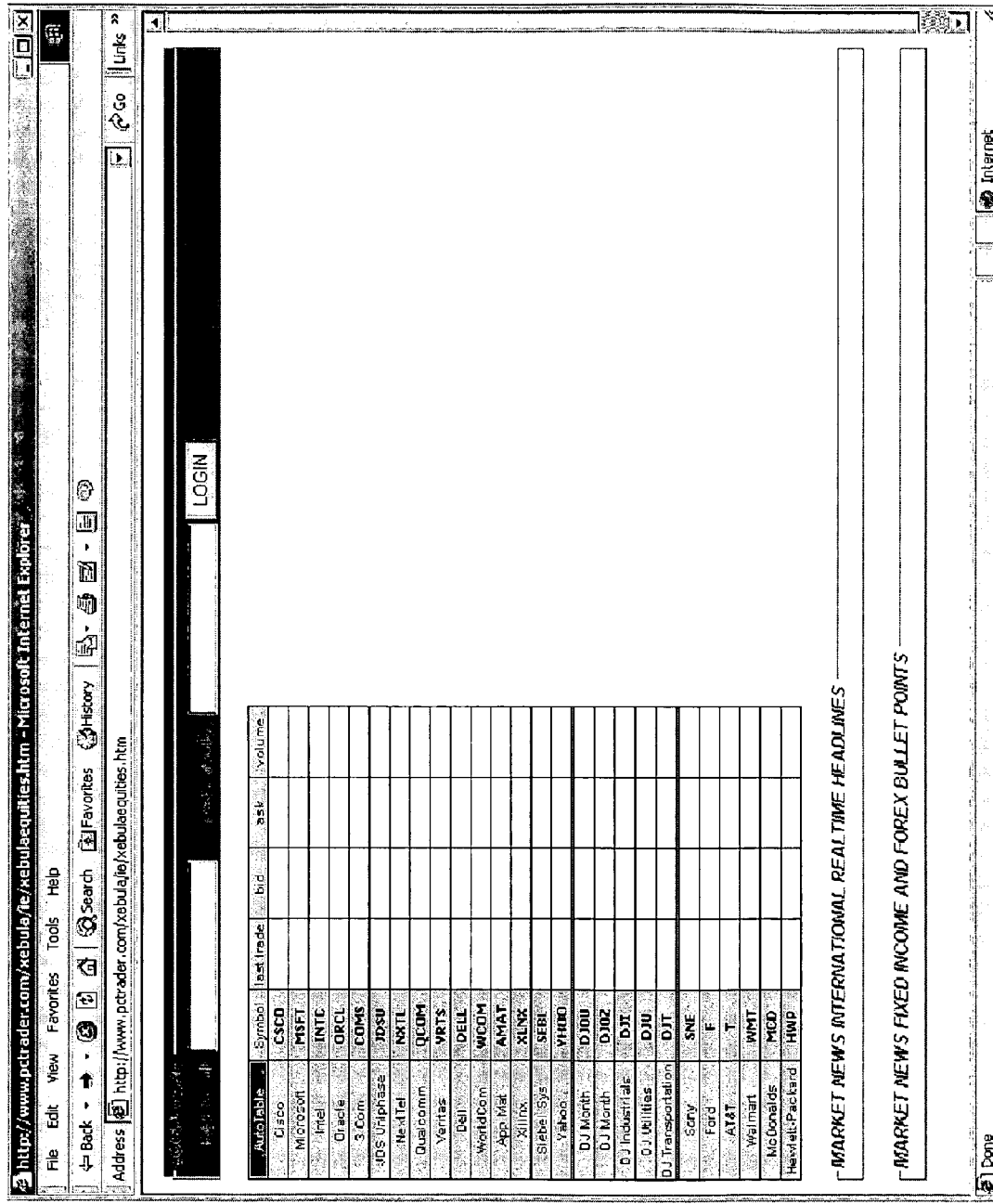

FIG. 14 illustrates yet another alternate interface within a browser. The top of the screen shows a username and password login interface. The customer's login information is kept in a relational database that is referenced every time a user logs in. This database specifies the type of data that the user is allowed to access (e.g., quote types, news sources, level of service).

Figure 15:
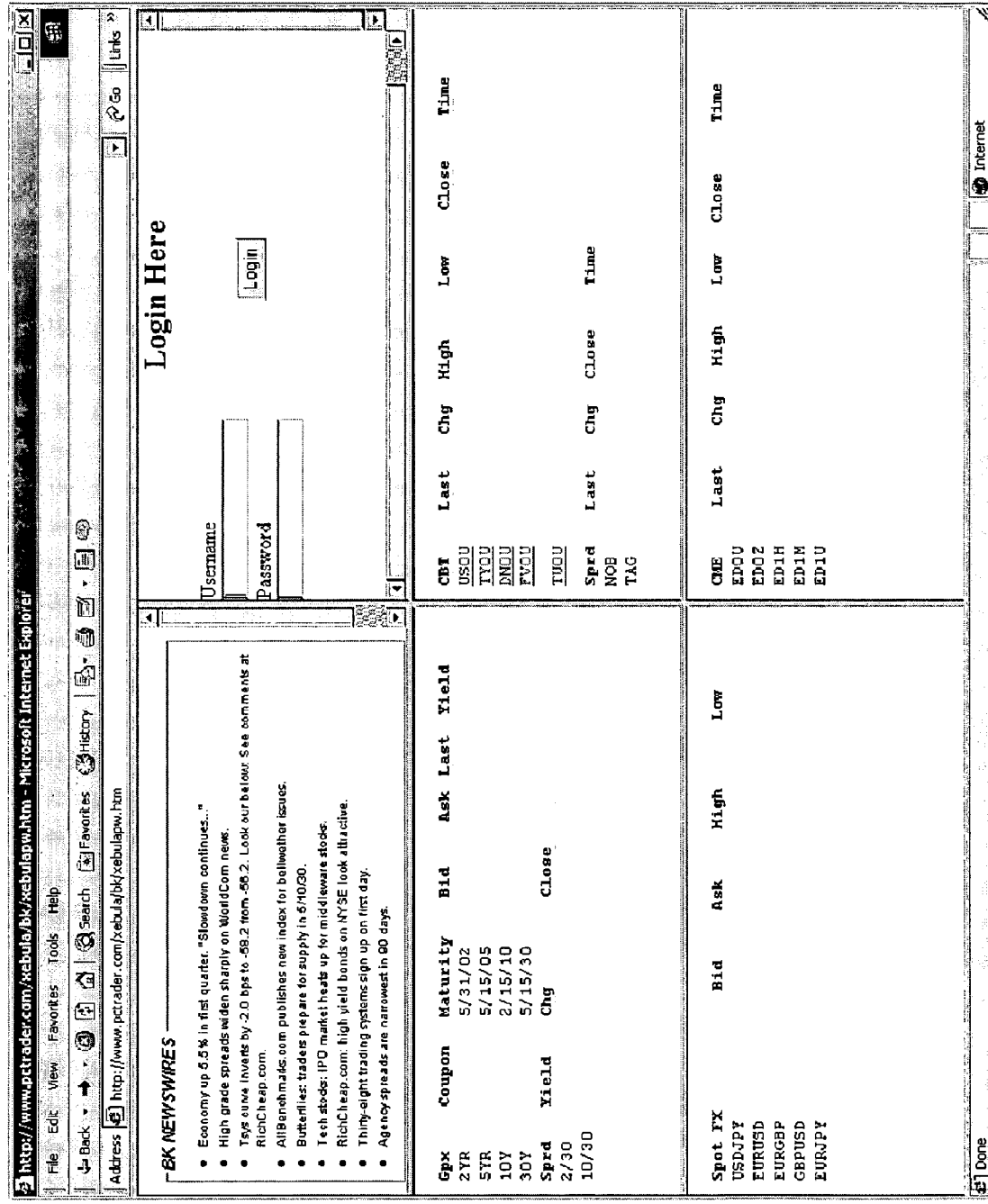

FIG. 15 illustrates a Web page that groups the data window-like display objects using frames instead of layers. However, as would be understood by one of ordinary skill in the art, other types of display objects (windows) are possible. For example, instead of using window-like objects that are layers as shown in FIG. 13 or frames as shown in FIG. 15, multiple "child" browser windows (essentially stripped down versions of the INTERNET EXPLORER web browser or the NETSCAPE web browser) can be managed by a single "parent" browser page. These child windows can be created and edited by the end user to contain any type of custom display that is important to that user. As with all types of customized display objects, the size and configuration of all of the child windows can be stored in a cookie or configuration database. After the data is stored, the user's customized settings will automatically appear on the screen the next time the user goes to that page.

In order to reduce the bandwidth utilized by communication, multicasting is used to send repetitive packets to multiple sites at the same time. When real-time packets arrive for retransmission, via a feed from a data vendor, a private source of information, or data customer of Ixnet, they are substantially instantly processed in multiple data servers and sent to all clients who have permissions to receive the packets. Because of the fundamental distributed processing foundation of Nebula, it has the ability to "multicast" to an enormous number of clients.

When a new news story is sent on a news wire the system instantly multicasts only the headline to all of the clients with permissions to view that news wire. The story text is sent to clients when they request a specific story. This represents a tremendous reduction of bandwidth usage. Moreover, the headlines may be further reduced using filtering of stories based on key words and other search criteria within headline windows and "smart story" windows.

The multicasting techniques built into the quote servers utilize the services of the list and priority servers. This combination of servers keeps track of the data actually being requested by all of the client programs (e.g., thousands) that are connected to the server farm. When quote packets for a specific quote symbol are received by the server farm, they are instantly multicast to all clients actually monitoring that symbol. Because all quote symbols are not always sent, this multicasting technique massively reduces network traffic and increases quote delivery speed.

In order for that selective distribution technique to work, however, the client programs must track all quote symbols that are included on all quote windows (minimized, normal, or maximized) on the currently active page, and communicate those symbols to the priority and/or list servers. The list servers keep track of the ever-changing list of requests from all active clients, and the requests from the lists are multicast in real-time.

For large installations on a single local area network, Internet and extranet traffic can be minimized by the installation of an on-site multicast server. This server communicates with all of the clients on the local area network and with the servers in server farm and reduces network traffic by delivering a local multicast.

The following example illustrates the local multicast functions. The multicast server will keep track of the fact that 150 local clients are viewing real-time news, 55 clients are viewing the 10-year Treasury note, and 75 clients are viewing the long bond contract from the Chicago Board of Trade. The local multicast server will request and receive only one set of packets from the server farm when each of the items are updated, but it will instantly pass through the updates to all of the local clients requesting the data. This represents a measurable savings in bandwidth which in turn lowers delivery costs to clients.

As discussed above, remote control and administration of server farms leads to increased responsiveness to problems. Using a remote management system, technicians can reboot servers, load new software, manually reconfigure the system, move users from one server to another, terminate users, and make other adjustments from office or home. The system maintains a central database of all configurations of all Digital Integrator middleware servers and the connections to other servers. Users of the middleware can dynamically reconfigure any nebula or server remotely to accommodate server failure or data feed loss or similar situations allowing for greater redundancy and failover protection. The system can either (1) maintain exception statuses manually or (2) intelligently monitor server statuses and reconfigure the middleware appropriately when the automatic failover protection within a middleware server farm is insufficient.

Figure 16:
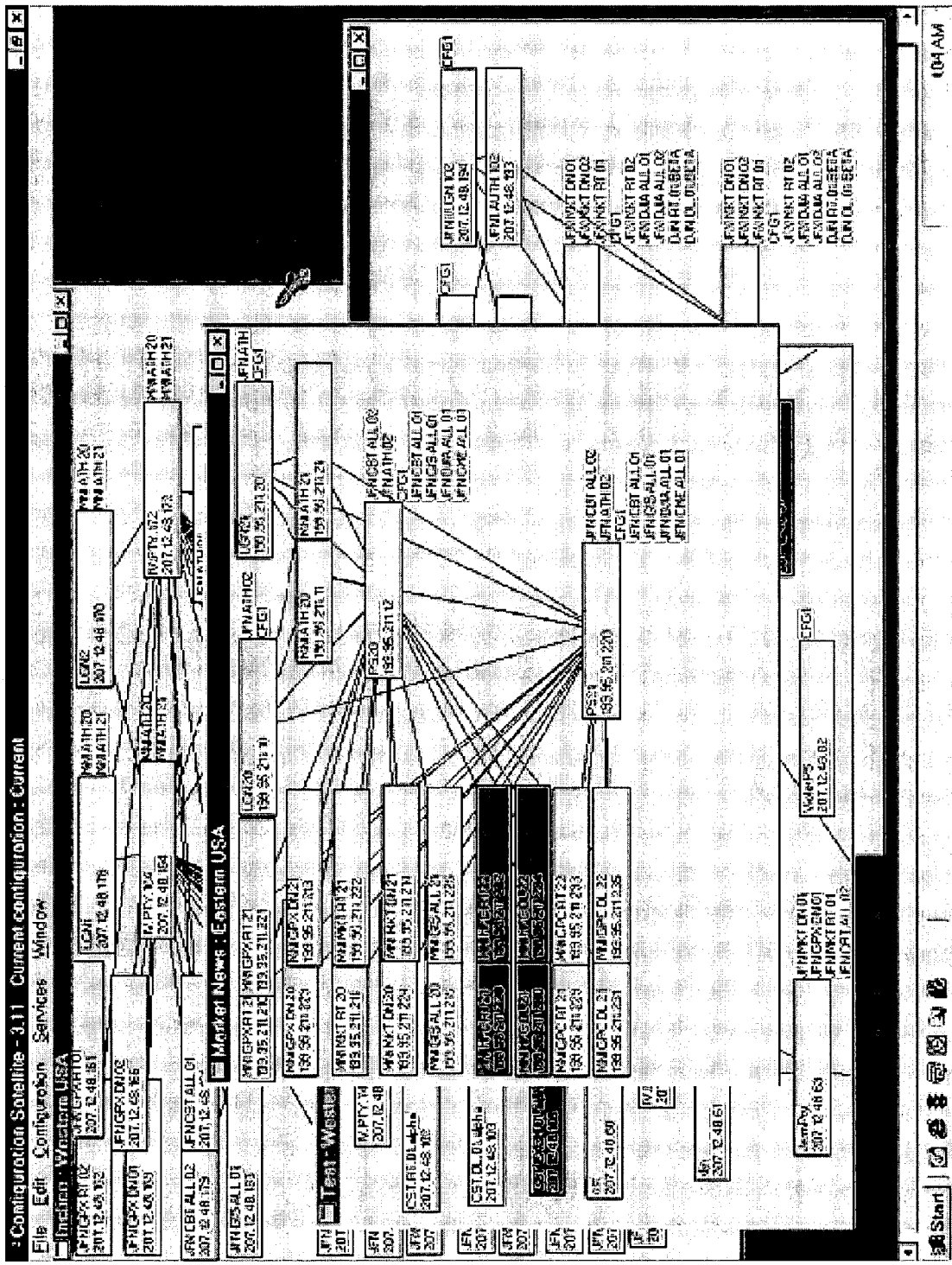
FIG. 16 is an exemplary screenshot of a visual tool for creating, storing and modifying configurations of servers (e.g., priority, data, and login servers)

FIG. 16 illustrates a visual tool for creating, storing and modifying configurations of servers. By selecting two servers and then the "connect" option, an administrator signals that a connection between the servers is to be generated. The connection can be generated either (1) the next time that the servers read a resulting configuration file or (2) immediately by sending a message to at least one of the affected servers.

Figure 17:
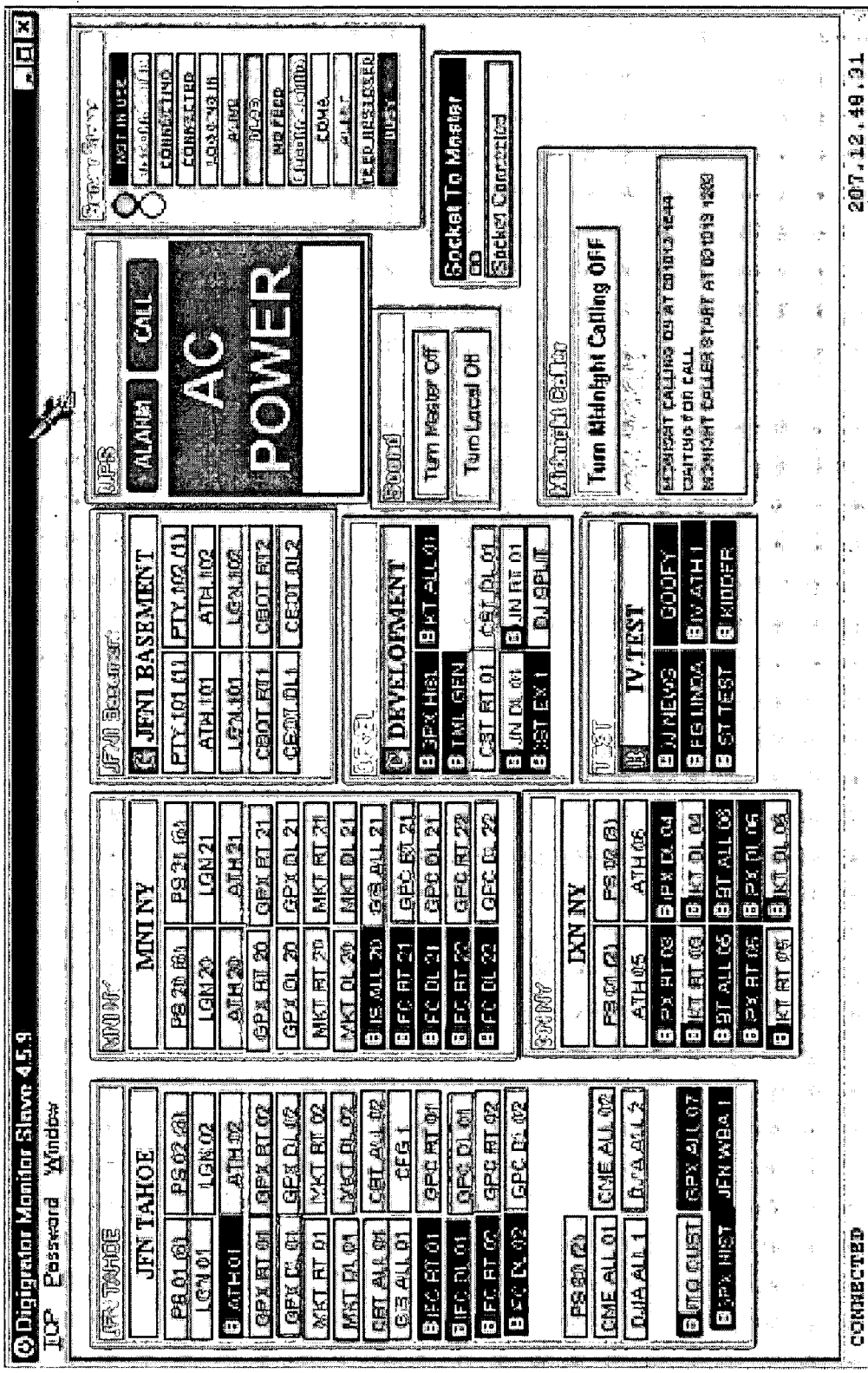
FIG. 17 is an exemplary screenshot of a visual tool for analyzing the status of a network of clients and servers.

FIG. 17 illustrates a visual tool for displaying the status of each of the servers in a selected group of servers within at least one network. The color-coded legend on the right-hand side of the tool's display indicates the status of each of the servers. Using this tool, an administrator can be selectively called by setting the "midnight caller" option to enabled. Using that option, a series of numbers are dialed in order to find a person that can service the error detected by the system. The notification is preferably made using a text-to-speech converter, but other notification methods (e.g., e-mails, pages, and wireless messages) can also be used.

Obviously, numerous modifications and variations of the present invention are possible in light of the above teachings. It is therefore to be understood that, within the scope of the appended claims, the invention may be practiced otherwise than as specifically described herein.

The invention claimed is:

1. A computer program product, comprising:
   a computer storage medium and a computer program code mechanism embedded in the computer storage medium for causing a computer to integrate plural information streams, within a middleware component, the computer program code mechanism comprising:
   a first computer code device configured to receive information from plural real-time information sources;
   a second computer code device configured to receive a sub-portion of non-real-time information;
   a third computer code device configured to deliver the information from the plural real-time information sources with higher priority than the sub-portion of non-real-time information; and
   a fourth computer code device configured to retrieve a remainder of the non-real-time information upon user request.

2. The computer program product as claimed in claim 1, wherein the plural real-time information sources, comprise exchange data and commodities data.

3. The computer program product as claimed in claim 1, wherein the sub-portion of the non-real-time information comprises a headline of a news story.

4. The computer program product as claimed in claim 3, wherein the fourth computer code device comprises a fifth computer device configured to respond to a user selecting the headline.

5. The computer program product as claimed in claim 3, wherein the fourth computer code device comprises a fifth computer device configured to respond to a user clicking on the headline.

6. The computer program product as claimed in claim 1, wherein the first computer code device comprises:

a fifth computer code device configured to receive the information from the plural real-time information sources in a binary format; and a sixth computer code device configured to expand the binary format into a streaming format.

7. The computer program product as claimed in claim 1, wherein the first computer code device comprises:

a fifth computer code device configured to receive the information from the plural real-time information sources in a binary format; and a sixth computer code device configured to expand the binary format into a streaming XML format.

8. The computer program product as claimed in claim 7, wherein the streaming format comprises a streaming XML format.

9. A computer system utilizing a middleware layer, the middleware layer comprising:

means for receiving information from plural real-time information sources;

means for receiving a sub-portion of non-real-time information;

means for delivering the information from the plural real-time information sources with higher priority than the sub-portion of non-real-time information; and means for retrieving a remainder of the non-real-time information upon user request.

10. The computer system as claimed in claim 9, wherein the plural real-time information sources comprise exchange data and commodities data.

11. The computer system as claimed in claim 9, wherein the sub-portion of the non-real-time information comprises a headline of a news story.

12. The computer system as claimed in claim 9, wherein the means for receiving information comprises:

means for receiving the information from the plural real-time information sources in a binary format; and means for expanding the binary format into a streaming format.

13. The computer system as claimed in claim 12, wherein the streaming format comprises a streaming XML format.

14. The computer system as claimed in claim 9, wherein the means for receiving information comprises means for receiving the information from the plural real-time information sources in a streaming XML format.

15. A computer-implemented method for processing information in a middleware layer, the method comprising:

receiving information from plural real-time information sources;

receiving a sub-portion of non-real-time information;

delivering the information from the plural real-time information sources with higher priority than the sub-portion of non-real-time information; and retrieving a remainder of the non-real-time information upon user request.

16. The method as claimed in claim 15, wherein the plural real-time information sources comprise exchange data and commodities data.

17. The method as claimed in claim 15, wherein the sub-portion of the non-real-time information comprises a headline of a news story.

18. The method as claimed in claim 15, wherein the step of receiving information comprises:

receiving the information from the plural real-time information sources in a binary format; and expanding the binary format into a streaming format.

19. The method as claimed in claim 18, wherein the streaming format comprises a streaming XML format.

20. The method as claimed in claim 15, wherein the step of receiving information comprises receiving the information from the plural real-time information sources in a streaming XML format.

* * * * *